US011051657B2

(12) United States Patent
Abehasera

(10) Patent No.: US 11,051,657 B2
(45) Date of Patent: Jul. 6, 2021

(54) ELECTRONIC GRINDER

(71) Applicant: TRI Innovations LLC, Hallandale Beach, FL (US)

(72) Inventor: Benyamin Abehasera, Hallandale Beach, FL (US)

(73) Assignee: TRI Innovations LLC, Hallandale Beach, FL (US)

( * ) Notice: Subject to any disclaimer, the term of this patent is extended or adjusted under 35 U.S.C. 154(b) by 309 days.

(21) Appl. No.: 16/285,609

(22) Filed: Feb. 26, 2019

(65) Prior Publication Data
US 2020/0269254 A1 Aug. 27, 2020

(51) Int. Cl.
*A47J 42/28* (2006.01)
*B02C 18/24* (2006.01)
*G01G 19/52* (2006.01)
*F23Q 2/32* (2006.01)
*A24B 7/14* (2006.01)
*B02C 18/10* (2006.01)
*G01G 23/37* (2006.01)
*A47J 42/26* (2006.01)
*A47J 42/06* (2006.01)
*A47J 42/16* (2006.01)
*A47J 42/36* (2006.01)

(52) U.S. Cl.
CPC .............. *A47J 42/28* (2013.01); *A24B 7/14* (2013.01); *A47J 42/06* (2013.01); *A47J 42/16* (2013.01); *A47J 42/26* (2013.01); *A47J 42/36* (2013.01); *B02C 18/10* (2013.01); *B02C 18/24* (2013.01); *F23Q 2/32* (2013.01); *G01G 19/52* (2013.01); *G01G 23/3721* (2013.01)

(58) Field of Classification Search
CPC ... A24B 7/14; A47J 42/00; A47J 42/46; A47J 42/56; A47J 42/06; A47J 42/16; A47J 42/26; A47J 42/32
See application file for complete search history.

(56) References Cited

U.S. PATENT DOCUMENTS

| 4,469,283 | A  | * | 9/1984  | Noguchi   | A47J 42/40  |
|           |    |   |         |           | 241/282.1   |
| 5,687,746 | A  | * | 11/1997 | Rose      | A24F 47/002 |
|           |    |   |         |           | 131/273     |
| 7,422,170 | B2 | * | 9/2008  | Bao       | B02C 18/24  |
|           |    |   |         |           | 241/168     |
| 9,427,020 | B2 | * | 8/2016  | Ruzycky   | B02C 18/144 |
| 9,737,092 | B2 | * | 8/2017  | Grumbacher | A24C 5/40  |
| 10,478,825| B2 | * | 11/2019 | Mroue     | B02C 18/10  |
| 2013/0025608 | A1 | * | 1/2013 | Fakhouri  | A24F 9/00   |
|           |    |   |         |           | 131/311     |

(Continued)

*Primary Examiner* — Faye Francis
(74) *Attorney, Agent, or Firm* — Berger Singerman LLP; Geoffrey Lottenberg

(57) ABSTRACT

A electronic grinder includes a main body removably attached to a grinding and dispensing chamber. The top of the main body is sealed by an upper cab and the bottom of the chamber is sealed by an openable lower cap. The main chamber includes a motor connected to a magnetically attached removable blade. The blade extends into the chamber when the grinder is assembled. When the lower cap is closed, the blade grinds material placed in the chamber. When the lower cap is opened, the blade functions as a fan to dispense ground material out of the chamber. The grinder also includes a display, an electronic scale, and an accessory cigarette lighter.

16 Claims, 2 Drawing Sheets

(56) References Cited

U.S. PATENT DOCUMENTS

| | | | | |
|---|---|---|---|---|
| 2014/0182604 A1* | 7/2014 | Hutton | A24C 5/42 | |
| | | | 131/70 | |
| 2014/0353412 A1* | 12/2014 | Grumbacher | A24C 5/40 | |
| | | | 241/70 | |
| 2016/0029691 A1* | 2/2016 | Ruzycky | A47J 42/12 | |
| | | | 241/24.1 | |
| 2016/0106262 A1* | 4/2016 | Mroue | A47J 42/30 | |
| | | | 241/79 | |
| 2017/0319009 A1* | 11/2017 | Seckel | B02C 18/2216 | |
| 2018/0020735 A1* | 1/2018 | Bilat | A24F 47/008 | |
| | | | 131/328 | |
| 2018/0103805 A1* | 4/2018 | Huang | B02C 19/08 | |
| 2018/0213838 A1* | 8/2018 | Richmond | A24C 5/44 | |
| 2018/0229243 A1* | 8/2018 | Nocine | A47J 42/30 | |
| 2018/0271328 A1* | 9/2018 | Petrossian | A47J 42/24 | |
| 2019/0159631 A1* | 5/2019 | Wafa | A47G 19/2205 | |
| 2020/0221904 A1* | 7/2020 | Girardi | A47J 42/50 | |
| 2020/0345061 A1* | 11/2020 | Veelo | B02C 18/142 | |
| 2021/0015146 A1* | 1/2021 | Chaben | A24F 40/48 | |

* cited by examiner

ELECTRONIC GRINDER

CROSS REFERENCE TO RELATED APPLICATIONS

N/A

FIELD OF THE INVENTION

The present invention relates to the technical field of grinders, more particularly to an electronic grinder adapted for grinding and pulverizing herbs and other materials.

BACKGROUND OF THE INVENTION

In daily life, people gradually begin to have personalized demands for smoking a small amount of tobacco or refined tobacco, hemp plants, hemp flowers, spices and herbs. Most of these products have to be pulverized or ground in order to effectively smoke. When grinding or pulverizing a variety of herbs, people have different requirements on the size and shape of the blades due to the difference in dryness, hardness and viscosity of different herbs. However, existing rotary shaft grinders usually have the blade fixedly connected to the shaft, therefore the blade cannot be easily replaced, thereby limiting the user to a single mode of pulverization. Additionally, portability has become a key market force in many categories, with users desiring small and more feature-packed electronic devices to serve their daily needs. Accordingly there is a need to improve upon the existing art and provide a more versatile and portable electronic grinder.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. Throughout this description, the embodiments and examples shown should be considered as exemplars, rather than as limitations on the invention. That is, the following description provides examples, and the accompanying drawings show various examples for the purposes of illustration. However, these examples should not be construed in a limiting sense as they are merely intended to provide examples of the invention rather than to provide an exhaustive list of all possible implementations thereof.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
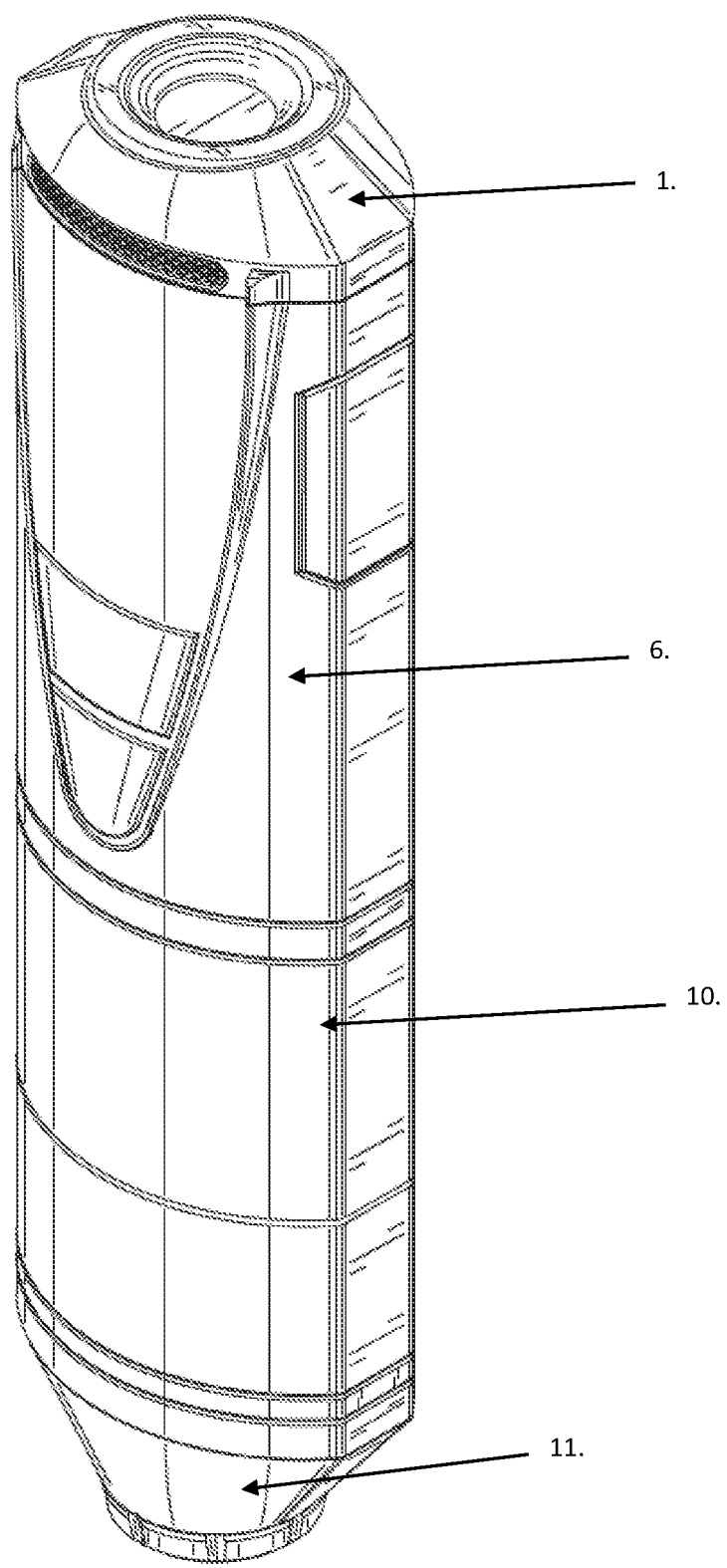
FIG.1 is a perspective view of the grinder.
Figure 2:
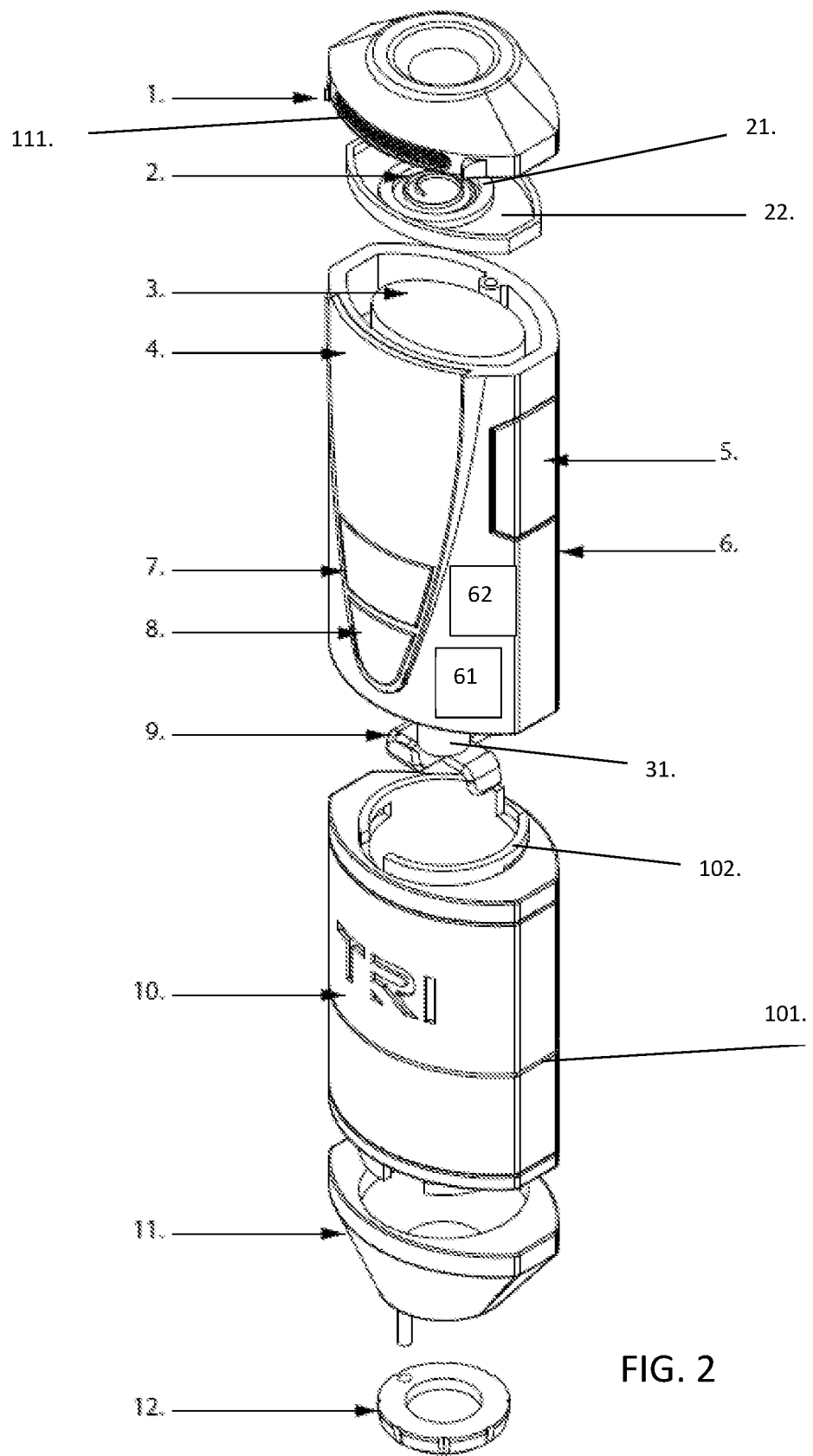
FIG.2 is exploded view of the grinder.

Referring to FIGS. 1 and 2, the multi-function electronic grinder of the present invention comprises a main housing 6 attached to a grinding and dispensing chamber 10. The distal end of the main housing 6 includes an upper cap 1 and the distal end of the chamber 10 includes a lower cap 11. In some embodiments, the main housing, chamber and respective upper and lower caps are removably engaged by snap fit, threads, magnetic connection, or the like. In some embodiments the chamber 10 includes a connector 102 of a BNC-type that engage corresponding geometry on the bottom of the main housing 6 for a secure connection.

The main housing 6 comprises and contains the various electronic components of the grinder including a display 4, control buttons 7 and 8, and a lighter button 5. Disposed within the main housing 6 is a motor 3 and related electronic components. The motor 3 drives a blade 9 by way of a drive shaft 31 disposed through the main housing 6. In some embodiments, the blade 9 is removably attached to the drive shaft 31 such that the blade can be removed for cleaning or replacement. In some embodiments, the blade 9 is magnetically but removably attached to the drive shaft for easy manual replacement.

A power source 61, such as a battery or external power supply, provides power to the motor 3, display 4, and other components of the grinder. A microcontroller 62 inside the housing controls the action of the motor and provides an input/output interface by way of control buttons 7 and 8, and light button 5. In some embodiments, the microcontroller 62 also provides power and communication connectivity for other components such as the heating device 2 and electronic scale 101 further described herein. In some embodiments the microcontroller 62 comprises a processor (CPU), memory, and control programming for the various input and output peripherals. The microcontroller is operable configured to provide over-load protection, safety protection based on temperature or speed, and can manage smart charging functionality which allows the grinder to be operated while charging.

The microcontroller may also include a communications device 63 such as a Wifi chip, a Bluetooth chip, a NFC chip, a Universal Serial Bus (USB) port, or combinations thereof. In some embodiments the communication device 63 is configured to communicate with an external computing device such as a computer or smartphone in order to send and receive data including status information and commands. Such data transmission can be accomplished through a customized application running on the smartphone or computer.

When the main housing 6 is attached to the chamber 10, the blade 9 is seated inside the chamber 10 such that it can effectively grind and pulverize material placed in the chamber. The bottom of the chamber 10 is open and terminates at lower cap 11, which includes a swivel-mounted cover 12. In some embodiments, the swivel-mounted cover 12 is magnetically but removably latched to the lower cap 11 so that it remains closed until sufficient manual force is applied to break the magnetic connection. The lower cap 11 is thus openable to provide a point of exit to dispense ground material from the chamber and out of the grinder but activating the blade 9 with the lower cap open. In some embodiments, the blade 9 can be configured to function as a grinder when rotating in one direction and to function as a fan when rotating in another direction. In some embodiments, the blade 9 comprises a fan-like structure to facilitate air flow as well as function as a grinding blade. Accordingly, the direction of the blade 9 can be reversed in order to force air out of the chamber and down toward to the cap 11 in order to assist in expelling and dispensing ground material from the chamber. However, in other embodiments, the blade can function both as grinder and a fan when rotating in the same direction and whether the blade functions to dispense material out of the chamber is dictated by whether the lower cap 11 is open.

In some embodiments, beneath the upper cap 1, seated at the top of the main housing 6 is a heating device 2 configured as a coil-type heating element 21 disposed on a sealing plate 22. In some embodiments the heating device 2 is in electrical communication with the power supply and received current therefrom which heats the wire to a sufficient temperature to ignite a smoking implement such as a cigarette. In some embodiments, the lighter is operated by lighter button 5 at the side of the main housing 6 and thus the heating device 2 is in communication with the microcontroller for such control functionality. Further still, in some embodiments there are two lighter buttons 5 on either side of the main housing 6, both of which have to be actuated simultaneously in order to activate the heating device 2. This adds an extra element of safety to the lighter aspect of the invention. The heating device 2 can be accessed by the user through a hole in the upper cap 1. Notably, however, unlike the bottom cap 11, in some embodiments the top of the main housing 6 remains sealed by way of the sealing plate of the heating device 2.

In some embodiments, the main housing 6 and/or the chamber 10 includes an electronic scale 101 for weighing the contents of the chamber 10. The electronic scale 101 may in some embodiments comprise a pad-type strain-gauge device that is in electrical communication with the microcontroller and power supply. In some embodiments the scale 101 comprises a partition within the chamber 10.

The display 4 and buttons 7 and 8 are multi-functional and enhance the user experience. The display 4 may be configured to display certain information including without limitation the battery level status, the weight of material in the chamber 10, the temperature of the lighter 2, or the like. Accordingly, the display may comprise LED, LCD, OLED, or the like and may output information as a digital alphanumerical readout or other indicators such as a series of lights. The buttons 7 and 8 may function as power and/or control buttons for various features. In some embodiments, for safety purposes the user must press both buttons 7 and 8 simultaneously in order to activate the blade 9 and carry out a grinding operation. In some embodiments, a light strip 111 is disposed on or around the edge of the upper cap 1. The light strip 111 is in electrical communication with the microcontroller and can function as a temperature and/or battery level indicator.

In use, the user removes the main body 6 from the chamber 10 and inserts material to be ground into the chamber. With the main body replaced onto the chamber and the swivel-mounted cover 12 closed, the user can activate the motor by way of the of the buttons such that the blade grinds the material in the chamber. If the user desires to dispense the material in the chamber, the cover 12 is opened and again the motor is activated and in a dispensing mode will generate air flow to expel the contents of the chamber out and through the lower cap 11. The user can also use the buttons 7 and 8 to carry out other functionality such as weighing the contents of the chamber and can likewise use the button(s) 5 to activate the heating device 2 for use a lighter for a cigarette or other purposes.

In some embodiments, the grinder includes connectivity features such that the communications device can communicate with an outboard smartphone or computer for added functionality. In some embodiments the grinder is "app-enabled" and works in conjunction with control and notification software. The user can utilize an application running on a smartphone or computer to obtain information from the grinder such as weight, battery status, or the like. In some embodiments, each time the grinder is turned the scale obtains a weight measurement and stores corresponding weight data in the memory of the microcontroller. Then, each time of the user loads the application on his computing device, the stored weight information is automatically synchronized to the application. The grinder can also be configured to send outbound alerts to advise the user that, for example, the weight of product in the grinder has dropped below a predetermined level. It can also store and display the original weight and the new weight after a dispensing operation. The application may also include functionality to permit the user to directly purchase new products to be used in conjunction with the grinder.

The materials selected for the grinder of the present invention are not particularly limiting however if the lighter 2 is included it may be desirable for at least a portion of the upper cap 1 and main housing 6 to be comprised of a relatively heat resistant material or have some heat resistant material or compound embedded therein. Further in some embodiments at least a portion of the chamber 10 is comprised of a transparent material so that the user can easily observe the contents therein.

It is appreciated and understood that the present invention provides an easy to use, compact electronic grinder that is capable of effectively pulverizing and dispensing a small amount of herb such as tobacco, hemp, Chinese herbal medicine, spices etc. for smoking or other uses. Moreover, the use of the magnetic shaft connector between the blade group and the drive shaft provides an easy and convenient way to remove the blade for cleaning or replacement with a blade of a same or different type, depending on user preferences and the target material to be pulverized. Additional convenience features such as the integrated scale and lighter provide an "all-in-one" portable solution that addresses many wants and desires in the art.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. An electronic grinder, comprising:
a main housing removably attached to a chamber, wherein the main housing is sealed at the top by an upper cap and the bottom of the chamber is sealed at the bottom by an openable lower cap;
the main housing including a motor configured to drive a blade;
wherein the blade extends into the chamber;
wherein the blade is removably connected to the motor by a magnetic connection;
wherein, with the lower cap closed, the blade rotates in a first direction to grind material disposed in the chamber;
and wherein, with the lower cap open, the blade rotates in a second direction to generate air flow which facilitates dispensing of the material from the chamber.

2. The electronic grinder of claim 1, wherein the upper cap includes an LED light strip.

3. The electronic grinder of claim 1, wherein the lower cap includes a swivel mounted cover to selectively open and close the lower cap.

4. The electronic grinder of claim 3, wherein the swivel mounted cover is magnetically attached to the lower cap to removably retain the cover against the cap.

5. The electronic grinder of claim 1, wherein a heating device is located beneath the upper cap between the cap and a top of the main chamber, the heating device configured as a coiled heating element disposed on a sealing plate.

6. The electronic grinder of claim 5, wherein the heating device is activated by simultaneously pressing lighter buttons disposed on either side of the main housing.

7. The electronic grinder of claim 1, wherein the main housing includes a microcontroller and a power supply, the microcontroller configured to operate and control the motor.

8. The electronic grinder of claim 7, wherein the microcontroller includes a communications device operable to communication with an external computing device.

9. The electronic grinder of claim 7, wherein the microcontroller is operably configured to provide over-load protection, safety protection based on temperature or speed, and can manage smart charging functionality which allows the grinder to be operated while charging.

10. The electronic grinder of claim 9, wherein the display is configured to display a status of the power supply.

11. The electronic grinder of claim 7, wherein the main housing includes a display and one or more control buttons, the display and the buttons each in communication with the microcontroller.

12. The electronic grinder of claim 1, wherein the chamber includes an electronic scale configured to weigh contents inside the chamber.

13. The electronic grinder of claim 1, wherein the chamber is at least partially transparent.

14. The electronic grinder of claim 1, wherein the main housing is removably connected to the chamber by a BNC connector.

15. An electronic grinder, comprising:
a main housing removably attached to a chamber;
the main housing sealed at the top by an upper cap and the bottom of the chamber is sealed at the bottom by an openable lower cap;
the lower cap including a swivel-mounted cover;
a heating device located beneath the upper cap between the cap and a top of the main chamber, the heating device configured as a coiled heating element disposed on a sealing plate;
the main housing including microcontroller, a power supply, a display, one or more buttons, and a motor, wherein the microcontroller configured to operate and control the motor to drive a blade attached to the motor by a drive shaft;
wherein the blade extends into the chamber;
wherein the blade is removably connected to the motor by a magnetic connection
wherein the blade is configured to grind material disposed in the chamber when the chamber is closed; and
wherein the blade creates air flow to dispense the material from the chamber when the chamber is open.

16. The electronic grinder of claim 15, wherein the chamber includes an electronic scale configured to determine the weight of contents inside the chamber and wherein the display is configured to display the weight.

* * * * *